United States Patent [19]

Smith

[11] 4,421,868
[45] Dec. 20, 1983

[54] POLYESTER-MELAMINE THERMOSETTING FOAM AND METHOD OF PREPARATION

[75] Inventor: Stuart B. Smith, Conyers, Ga.

[73] Assignee: Thermocell Development, Ltd., Knoxville, Tenn.

[21] Appl. No.: 425,396

[22] Filed: Sep. 28, 1982

Related U.S. Application Data

[63] Continuation-in-part of Ser. No. 379,118, May 17, 1982, abandoned.

[51] Int. Cl.³ .................................................. C08J 9/14
[52] U.S. Cl. ..................................... 521/112; 521/125; 521/128; 521/129; 521/163; 521/166; 521/172; 521/901; 521/906
[58] Field of Search ............... 521/112, 125, 128, 129, 521/166, 163, 901, 906

[56] References Cited

U.S. PATENT DOCUMENTS

| | | | |
|---|---|---|---|
| 4,221,875 | 9/1980 | Yukuta et al. | 521/163 |
| 4,293,657 | 10/1981 | Nissen et al. | 521/166 |
| 4,302,551 | 11/1981 | Horn et al. | 521/163 |
| 4,317,889 | 3/1982 | Poelinsky, Jr. | 521/166 |

*Primary Examiner*—Morton Foelak
*Attorney, Agent, or Firm*—Richard P. Crowley

[57] ABSTRACT

A polyester-melamine-isocyanurate thermosetting foam composition having improved flame, smoke and non-burning properties with good compressive strength, which foam composition is prepared by the admixture of a saturated polyester resin, a flame-retardant amount of melamine, a methylene diisocyanate, in the presence of a silicone-glycol surfactant, a fluorocarbon blowing agent and a trimerization catalyst to provide a closed-cell thermosetting foam.

18 Claims, No Drawings

POLYESTER-MELAMINE THERMOSETTING FOAM AND METHOD OF PREPARATION

REFFERENCE TO PRIOR APPLICATION

This application is a continuation-in-part of U.S. Ser. No. 379,118, filed May 17, 1982, hereby incorporated by reference now abandoned.

BACKGROUND OF THE INVENTION

Thermosetting foams have been produced by the reaction of polyester resins with methylene diisocyanate. Such foams have been characterized by high compressive, tensile and flexure strengths. However, the high viscosity of the polyester resin in the reaction mixture tends to make the processing and preparing of the foams, on a commercial and continuous basis, difficult. In such rigid polyester foams, the K-factors are often quite high; that is, the foams are of poor insulation quality, due to the incompatibility of the fluorocarbon blowing agents in the reaction mixture. The polyester foams, of both a rigid and a flexible nature, tend to burn, because they are oxygen-rich; however, such foams produce low smoke values.

Polyisocyanates have been reacted in the presence of a trimerization catalyst, to produce polyisocyanurate foams, in an attempt to produce foams which produce high char resistance to fire and low smoke values. However, in such foams, only high char resistance has been obtained. The rigid trimerized polyisocyanurate-type foams produced tend to have higher K-factors than urethane foams, but also are quite brittle and frangible in nature. The trimerization of methylene diisocyanate produces a foam of low smoke value, but black in color, and which is relatively nonburning. The problems with such methylene diisocyanate trimerized foam are the poor compressive strength and high friability. In order to correct or to mask these undesirable properties, it has been the practice to incorporate small amounts of urethane polyols, such as sucrose amine, glycols or aromatic amines, in the isocyanate reaction mixture, to produce a modified, urethane-polyisocyanurate foam. However, the addition to such urethane polymers leads to degradation in the fire and smoke properties of the modified foam.

Polyurethane foams; that is, foams prepared by the reaction of a polyhydroxyl compound and a polyisocyanate in the presence of a urethane catalyst, provide foams of unacceptable flame resistance. It has been proposed that such polyurethane foams be modified by the addition of a nonreactive amount of a melamine powder in the reaction mixture, to confer enhanced flame resistance on the resulting polyurethane foam (see U.S. Pat. No. 4,221,875, issued Sept. 9, 1980).

It is desirable to prepare an inexpensive polyester thermosetting foam composition which avoids the disadvantages of the prior-art polyester foams, the rigid polyisocyanurate foams, the modified polyurethane foams and the polyurethane foams of the prior art.

SUMMARY OF THE INVENTION

The invention relates to a thermosetting foam and the method of preparing the foam. In particular, the invention concerns a polyester-melamine-methylene diisocyanate thermosetting foam and the method for preparing same, which foam is characterized by high compressive strength, low K-values, low flame spread and smoke properites and other desirable physical properites, which foam products are suitable for use in the construction and insulation field.

It has been discovered that a thermosetting foam composition of improved physical properties can be prepared by the admixture and reaction of a saturated polyester resin, melamine and a methylene diisocyanate in the presence of a blowing agent, a surfactant and trimerization catalyst, to provide a foam with substantially reduced smoke or burning properties and acceptable K-values and high compressible strength.

The polyester resins useful in the practice of the invention comprise saturated polyester resins, such as those resins prepared by the reaction of a saturated dicarboxylic aliphatic or aromatic acid, such as adipic acid or phthalic acid, with a dihydroxylic alcohol, such as, for example, ethylene glycol, propylene glycol, diethylene and dipropylene glycol and mixtures thereof. The saturated polyester resin may be linear or branch-chain resins and preferably branch-chain, saturated polyester resins. The polyester resins contain hydroxyl groups and typically, for use in the invention, have a hydroxyl number ranging from about 30 to 250, and more typically 100 to 225.

The saturated polyester resin is typically admixed with melamine, prior to admixing with the methylene diisocyanate, the amount of melamine being in an amount sufficient to provide a flame-retardant resulting foam, and more particularly in an amount of over about 100 parts of melamine per 100 parts of the saturated polyester resin; for example, 100 to 200 parts per 100 parts of the saturated resin, such as 100 to 150 parts. However, the employment of excess melamine should be avoided, in order to avoid sublimation of melamine and the production of white smoke and toxic hydrocyanic gas at high temperatures. In U.S. Pat. No. 4,221,875, supra, melamine is added as a flame retardant in a polyurethane foam; however, the melamine, when used as a nonreactant, sublimes at high temperature, producing white smoke and toxic gas, while in the present invention, with the melamine admixed with a glycol, saturated polyester resin, no sublimation of the melamine occurs, unless a stoichiometric excess is employed.

In the practice of the invention and after the preparation of the admixture of the saturated polyester resin and the melamine, the admixture is reacted in the presence of one and typically two or more trimerization catalysts with methylene diisocyanate. The methylene diisocyanate may comprise the standard or conventional crude methylene diisocyanate mixture having a functionality, for example, of about 2.7 or greater, and, for example, with more than about 30% free isocyanate groups. However, it has been discovered that methylene diisocyanates of high acid number; that is, of a functionality of about 2.4 or less and, for example, with a minimum of 50% of difunctional groups, provide for the production of a polyester thermosetting foam of lower smoke values of under 10 by ASTM E-84 tests. It is believed that the higher functionality methylene diisocyanate products contain more stearic hindrance, which inhibits the more rapid cross-linking of the isocyanate in polyisocyanurate linkages, and, therefore, methylene diisocyanates of lower functionality than 2.7, particularly about 2.4, are desirable, to promote rapid reaction. The higher functionality methylene diisocyanates are believed to permit the formation of some urethane linkages to form before trimerization occurs and, therefore, to produce lower quality foams. The amount of the methylene diisocyanate used may range from about 100 parts per 100 parts of the admixture; for example, from 100 to 250 parts, and more particularly 150 to 200 parts.

The reaction of the polyester-melamine product with the methylene diisocyanate is carried out in the presence of a blowing amount of a blowing agent, typically a liquid halocarbon, such as a fluorocarbon, and more particularly a chlorofluoro methane or ethane, such as, for example, fluorotrichloro methane, so as to provide the resulting closed-cell thermosetting foam composition with a low K-factor and high insulating properties, typically less than about 0.15 K-factor. The blowing agent may be employed in varying amounts, such as, for example, from about 1 to 20 parts of blowing agent per 100 parts of the polyester resin, the melamine and the methylene diisocyanate, and more particularly 5 to 15 parts.

The reaction is also carried out in the presence of a surfactant or cell-control agent, typically a silicone surfactant in an amount of from about 0.3 to 4 parts per 100 parts of the diisocyanate. More particularly, it has been found that, where a fluorocarbon blowing agent is employed, the silicone employed should be a silicone-glycol surfactant, rather than the nonglycolsilicone surfactant, in order to enhance the compatibility of the fluorocarbon in the reaction system. For example, a silicone-glycol copolymer employed as a cell-control agent may be used, the silicone-glycol copolymer being soluble in the polyester resin. If desired, a combination of silicone-glycol surfactant, together with a standard silicone surfactant, may be employed, or the standard silicone surfactant employed in combination with a glycol compound, for example, 1 to 20 parts per 100 parts MDI, to enchance compatibility of the standard surfactant in the system, such as ethylene or propylene glycol; however, excess amounts of ethylene or propylene glycol should be avoided, in order to prevent diminution of the flame and smoke properties of the resulting rigid foam.

The reaction of the polyester-melamine admixture product with the methylene diisocyanate is also carried out in the presence of one or more trimerization catalysts and in the absence of catalysts which tend to form urethane linkages; that is, in the absence of urethane catalysts. Trimerization catalysts, for the preparation of isocyanurate foams, are well known and would include, but not be limited to, the dialkylaminomethyl phenols, such as the mono, di and tri dimethylaminomethyl phenols and, particularly, quaternary ammonium salts and fatty-acid esters of alkali metals, such as potassium, such as, for example, $C_6$-$C_{12}$ fatty-acid esters like octoates. Standard urethane-type catalysts which promote the formation of urethane linkages, such as the triethylene diamines, or tin fatty-acid catalysts, should be avoided. The amount of the trimerization catalyst may vary, but typically ranges from 0.1 to 15 parts; for example, 1 to 10 parts, per 100 parts of the methylene diisocyanate. It is preferred that trimerization catalysts be employed in combination with two or three trimerization catalysts employed together, to promote a rapid reaction. The trimerization-catalyst system should be selected, so that there is a long delay cream time of the reaction mixture to produce the thermosetting foam on a continuous basis in conventional production-line mixing equipment.

The polyester thermosetting foam of the invention may be characterized by having a compressive strength generally of greater than about 30 psi and typically about or greater than 40 psi, and, with an ASTM E-84 Steiner tunnel test, a flame spread of 20 or less and typically 10 or less, and a smoke value of 50 or less and typically 25 or less. The density of the foam produced may vary, depending upon the selection of the ingredients, but the foam produced is a fine-cell, closed-cell foam having a density of about 20 lbs. per cubic foot or less, and more typically from about 2 to 3 lbs. per cubic foot.

The method of preparation of the polyester thermosetting foam composition comprises the addition of the melamine directly into the polyester resin at room temperatures; for example, 60° F. to 80° F., together with mixing, and the addition of the surfactant, blowing agent and trimerization catalyst in the mixture, and, thereafter, the addition of the methylene diisocyanate with mixing, to provide an exothermic reaction and the creation of the resulting thermosetting foam product. One or more of the components of the blowing agent, surfactant and catalyst may be present during the melamine reaction.

The invention will be described in connection with certain embodiments; however, it is recognized that various changes and modifications may be made by those persons skilled in the art, all falling within the spirit and scope of the invention.

DESCRIPTION OF THE EMBODIMENTS

EXAMPLE 1

| | |
|---|---|
| 20 parts | Polyethylene glycol 400 |
| 100 parts | Methylene diisocyanate (MDI) |
| 1 part | Silicone surfactant (DC-193 (Dow Chemical Co.)) |
| 1 part | Potassium octoate - trimerization catalyst |
| 1 part | Dimethylaminomethyl phenol (DMP-30) - trimerization catalyst |
| 30 parts | Freon F-11 - fluorotrichloro methane |

ASTM E-84 Steiner tunnel test

| | |
|---|---|
| Flame spread - 50 | Compressive strength - 30 psi |
| Smoke - 225 | K-factor - .13 |
| | Density - 2.0 pcf |

This standard polyisocyanurate foam has poor strength, is friable and produces high smoke.

EXAMPLE 2

Same as Example 1 above, with 10% by weight of a chlorinated polyol flame retardant (Thermoline, a trademark of Olin Corp.). The physical properties were the same.

| ASTM E-84 Steiner tunnel test | |
|---|---|
| Flame spread - 25 | Smoke - 225 |
| Some char strength | |

The addition of a chlorinated flame retardant improved char strength, but did not improve smoke values.

EXAMPLE 3

Same as Example 2 above, with 40 parts of polyethylene glycol-400.

| ASTM E-84 Steiner tunnel test | |
|---|---|
| Flame spread - 75 | Compressive strength - 35 |
| Smoke - 450 | K-factor - .12 |
| Poor char | Density - 2.0 |

The addition of a polyol to improve friability and strength increased flame spread and smoke values.

EXAMPLE 4

| 100 parts | Witco polyester resin 11-225 (saturated polyester resin prepared by reaction of adipic acid and diethylene glycol, hydroxyl number 225, viscosity 500 cps) |
|---|---|
| 100 parts | MDI |
| 1 part | Silicone surfactant (DC-193) |
| 20 parts | Freon F-11 |
| .2 parts | stannous octoate - urethane catalyst |
| .2 parts | triethylene diamine - urethane catalyst |
| ASTM E-84 Steiner tunnel test | |
| Flame spread - 100 | Smoke - 100 |

The polyester-urethane foam produced in Example 4 tends to be semiflexible, with open cells, poor K-factor, high tensile and flexure strength, and burns, but has low smoke and has no char strength.

EXAMPLE 5

| 20 parts | Witco 11-225 - saturated polyester resin |
|---|---|
| 100 parts | MDI |
| 1 part | Silicone surfactant (DC-193) |
| 20 parts | Freon F-11 |
| 1 part | Potassium octoate - trimerization catalyst |
| 1 part | DMP-30 |
| ASTM E-84 Steiner tunnel test | |
| Flame spread - 75 | Compressive strength - 40 psi |
| Smoke - 100 | K-factor - .15 |
| | Density - 2.0 |

A rigid polyester-isocyanurate foam is produced with very high compressive strength, is friable, has a poor K-factor and good char, but burns and smokes.

EXAMPLE 6

| 30 parts | Witco 11-225 - saturated polyester resin |
|---|---|
| 35 parts | Melamine |
| 1 part | Silicone surfactant (DC-193) |
| 1 part | Potassium octoate - trimerization catalyst |
| 1 part | Quaternary ammonium salt (TMR) - a trimerization catalyst (Air Products Inc.) |
| 100 parts | MDI |
| 20 parts | Freon F-11 |
| ASTM E-84 Steiner tunnel test | |
| Flame spread - 10 | Compressive strength - 40 psi |
| Smoke - 20 | K-factor - .14 |
| High char, no cracking | Density - 2.0 pcf |

Example 6 represents a polyester thermosetting foam of the invention in which the polyester resin was first admixed with the melamine, then the surfactant, Freon F-11 and the trimerization catalyst added and mixed therein, with the addition of the MDI. An exothermic reaction provided a cured thermosetting foam of the listed properties.

EXAMPLE 7

| 30 parts | Witco 11-225 - saturated polyester resin |
|---|---|
| 35 parts | Melamine |
| 1 part | Silicone glycol (DC-197) |
| 1 part | TMR |
| 1 part | Potassium octoate |
| 100 parts | MDI |
| 20 parts | Freon F-11 |
| ASTM E-84 Steiner tunnel test | |
| Flame spread - 10 | Compressive strength - 40 |
| Smoke - 20 | K-factor - .125 |
| High char | Density - 2.0 |

A glycol-silicone surfactant was used to improve the compatibility of the blowing agent in the system, which resulted in an improved K-factor.

EXAMPLE 8

| 30 parts | Witco #53 - a branch saturated polyester resin (viscosity 25,000 cps, OH number 55) |
|---|---|
| 35 parts | Melamine |
| 1 part | Silicone-glycol surfactant (DC-197) |
| 100 parts | MDI |
| 1 part | TMR |
| 1 part | Potassium octoate |
| 20 parts | Freon F-11 |
| ASTM E-84 Steiner tunnel test | |
| Flame spread - 10 | Compressive strength - 35 |
| Smoke - 20 | K-factor - .125 |
| High char strength | Density - 2.0 pcf |

Urea was substituted for the melamine in Examples 6–8. The results produced a semiflexible foam product which burned and smoked.

Due to the high costs of silicone-glycol surfactants, standard glycols, such as dimethylene glycol and polyethylene glycol-400, were used in small amounts (5 to 20 parts). The results showed a decrease in K-factor, but also a decrease in char strength to fire.

EXAMPLE 9

Example 8 was repeated employing MDI having a functionality of 2.4 and a high acid number (280), compared with standard MDI having a functionality of 2.7 and an acid number of 100. The foam produced had an ASTM E-84 smoke value of less than 10.

What is claimed is:

1. A polyester thermosetting foam composition having improved flame, smoke and burning high-temperature properties with high compressive strength, which foam composition is prepared by:

(a) the mixing of a saturated polyester resin, which resin is prepared by the reaction of a saturated dicarboxylic acid with an aliphatic dihydroxy alcohol, to provide a saturated polyester resin having reactive hydroxyl groups, with from about 100 or more parts of melamine per 100 parts of the saturated resin; and, (b) reacting the melamine-polyester admixture in the presence of a blowing agent, sufactant and trimerization catalyst and in the absence of a urethane catalyst, with a methylene diisocyanate, to produce the thermosetting foam composition.

2. The composition of claim 1 wherein the amount of melamine ranges from about 100 to 200 parts of melamine per 100 parts of the saturated resin.

3. The composition of claim 1 wherein the surfactant comprises a silicone surfactant.

4. The composition of claim 1 wherein the saturated polyester resin is a branch-chain, saturated polyester resin.

5. The composition of claim 1 wherein the hydroxyl number of the saturated polyester resin ranges from about 30 to about 250.

6. The composition of claim 1 wherein the methylene diisocyanate has an acid number of greater than about 200.

7. The composition of claim 1 wherein the thermosetting foam composition produced is characterized by a smoke value measured by ASTM E-84 of about 20 or less.

8. The composition of claim 1 wherein the saturated polyester resin is the reaction product of adipic acid and a diethylene glycol.

9. The composition of claim 1 wherein the trimerization catalyst is selected from the group consisting of a potassium fatty-acid salt, a quaternary ammonium salt and dimethylaminomethyl phenol.

10. The composition of claim 1 wherein the methylene diisocyanate ranges from about 100 to 200 parts per 100 parts of the polyester-melamine reaction mixture.

11. The composition of claim 1 wherein the methylene diisocyanate has a functionality of about 2.4 or lower.

12. The composition of claim 1 wherein the blowing agent is a liquid fluorocarbon.

13. The composition of claim 1 wherein the surfactant is a glycol-silicone surfactant, to enhance the compatibility of the blowing agent in the reaction mixture.

14. The composition of claim 1 which includes from about 1 to 20 parts per 100 parts of the methylene diisocyanate of an ethylene or propylene glycol.

15. The composition of claim 1 wherein the composition comprises a substantially closed cell foam having a compressive strength greater than about 30 psi, an ASTM E-84 flame spread of 20 or less and a smoke value of 25 or less.

16. A polyester thermosetting foam composition having improved flame, smoke and high-temperature properties with high compressive strength, which foam composition is prepared by:
(a) the mixing of a saturated polyester resin, prepared by the reaction of an adipic acid and an ethylene or propylene glycol, and having a hydroxyl number ranging from about 50 to 250, with from about 100 to 200 parts of melamine per 100 parts of the saturated resin to provide a melamine-polyester admixture; and
(b) reacting, in the presence of a blowing amount of a fluorocarbon blowing agent, a silicone surfactant and a isocyanate trimerization catalyst and in the absence of a urethane catalyst, the melamine-polyester product, with from about 100 to 200 parts of a methylene diisocyanate per 100 parts of the admixture, the methylene diisocyanate having a functionality of about 2.4 or less.

17. The composition of claim 16 wherein the trimerization catalyst comprises an admixture of a potassium fatty acid salt and a quaternary ammonium salt in an amount of from about 1 to 10 parts per 100 parts of the methylene diisocyanate.

18. The composition of claim 16 wherein the surfactant is a glycol-silicone surfactant in an amount of from 0.3 to 4 parts per 100 parts of methylene diisocyanate.

* * * * *